March 16, 1965  E. R. JOLLY  3,173,379
MEANS AND METHOD OF PUMPING LIGHTWEIGHT CONCRETE
Filed May 11, 1961  2 Sheets-Sheet 1

INVENTOR.
EUGENE R. JOLLY
BY
ATTORNEYS

March 16, 1965   E. R. JOLLY   3,173,379
MEANS AND METHOD OF PUMPING LIGHTWEIGHT CONCRETE
Filed May 11, 1961   2 Sheets-Sheet 2

INVENTOR.
EUGENE R. JOLLY
BY Lyon & Lyon
ATTORNEYS

United States Patent Office 3,173,379
Patented Mar. 16, 1965

3,173,379
MEANS AND METHOD OF PUMPING
LIGHTWEIGHT CONCRETE
Eugene R. Jolly, Montebello, Calif. (% Cellular Products Co., 1238 S. Atlantic Blvd., Los Angeles, Calif.)
Filed May 11, 1961, Ser. No. 109,318
9 Claims. (Cl. 103—238)

This invention relates to means and method of pumping lightweight concrete.

Lightweight concrete may comprise an aggregate which includes inherently lightweight ingredients such as pumice, exfoliated vermiculite, perlite, expanded shale mixed with Portland cement, and water in proper proportions.

Also lightweight concrete may be formed by aerating Portland cement slurries or Portland cement and aggregate mixtures under conditions in which stabilized air cells are produced. Further, the mixture may be foamed by various gases generated within the mixture. Still further, a stabilized foam is separately produced and added to the mixture.

Such lightweight concretes, which are commonly called "cellular" or "foamed," or "aerated" concretes, are characterized by a rather large volume of air or gas, usually from 15% to 80% by volume, and have densities ranging from 15 pounds per cubic foot to 110 pounds per cubic foot.

Included in the objects of this invention are:

First, to provide a means and method of pumping lightweight concrete wherein the difficulties inherent in pumping a lightweight or aerated concrete by mechanical means is avoided; that is, violent mechanical agitation of the concrete and air mixture, tending to separate the air from the mixture, is minimized, and the loss in pumping efficiency due to compression of the air in the mixture is also minimized.

Second, to provide a means and method of pumping lightweight or aerated concrete, which utilizes compressed air as the motive power in such a manner as to maintain a substantially continuous flow without pressure surges and consequent intermittent expansion and contraction of the aerated concrete mixture, or bodily movement of the hose or other supply line, thus minimizing wear thereon.

Third, to provide a means of pumping lightweight concrete wherein two pressure vessels are utilized in such a manner that one vessel may be filled while the other vessel is in operation, and wherein, on depletion of the contents of either vessel, the motive air compressed therein is transferred to the other vessel, thereby effecting a substantial economy in the time required to transfer from one vessel to the other as well as the volume of air required.

Fourth, to provide a means and method of pumping lightweight concrete which incorporates a novelly arranged check valve in connection with each pressure vessel, so that on relieving the pressure in either vessel during its filling cycle the concrete or compressed air from the operating vessel is automatically prevented from backflow.

Fifth, to provide a means and method of pumping lightweight concrete which incorporates a novel means of detecting, when either vessel is almost empty, and if desired operates automatic control means to terminate flow from one vessel, as its contents are depleted, and initiate flow from the other vessel.

With the above and other objects in view, as may appear hereinafter, reference is directed to the accompanying drawings in which.

Figure 1:
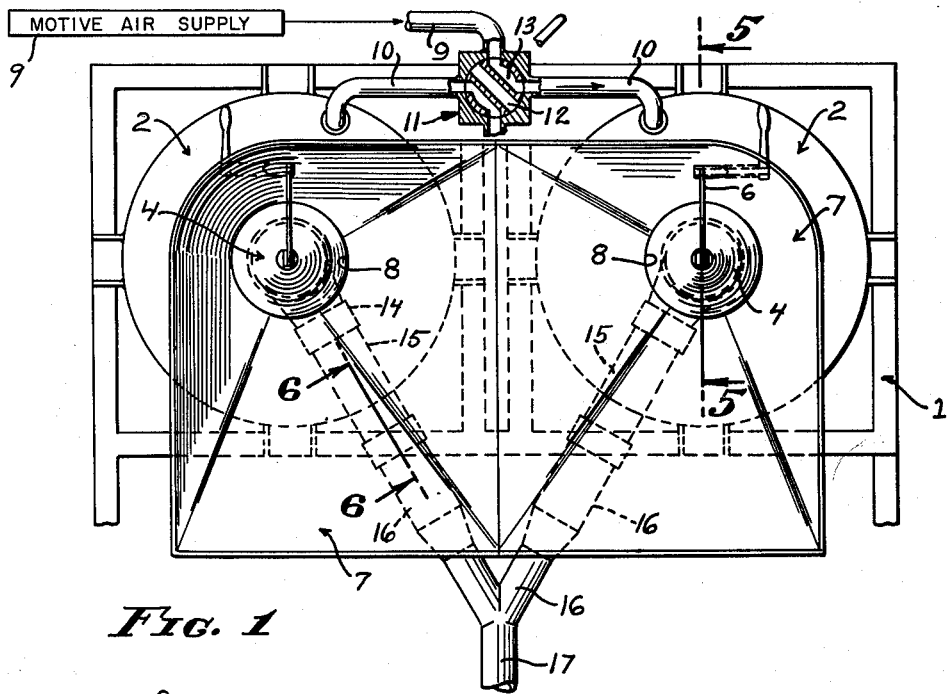
FIGURE 1 is a fragmentary plan view of the means for pumping aerated concrete, with the control valves and motive fluid supply indicated diagrammatically, and showing the control valve in position to supply motive fluid to one of the pressure vessels.

The means for pumping aerated concrete is mounted on a framework 1 which is indicated fragmentarily. The framework may form part of a chassis of a truck or trailer to facilitate transportation.

Mounted on the framework 1 is a pair of pressure vessels 2 which may be identical in construction. Each pressure vessel is provided with an inlet opening 3 at its upper end, which is adapted to be closed by a conical gate or valve member 4. The gate is larger than the inlet opening so that its lower marginal portion may engage a valve seat 5 provided in the inlet opening, and is held against the seat by pressure within the pressure vessel.

Figure 3:
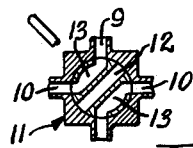
FIGURE 3 is a similar diagrammatical view of the control valve shown in position for pressurizing the other of said pressure vessels.

The gate 4 is mounted on one arm of a hand lever 6 so arranged that the gate may be moved between its sealing position, shown by solid lines in FIGURE 3, and a laterally displaced position within the pressure vessel, as indicated by broken lines in FIGURE 3.

Mounted on top of the pressure vessels 2 is a distributor pan 7 which overlies both vessels, and is provided with two openings 8 which register with the inlet openings 3 of the two pressure vessels. The distributor pan 7 enables aerated concrete to be delivered to either pressure vessel from a swinging spout structure, not shown, connected with a conventional hopper or mixing apparatus.

Figure 2:
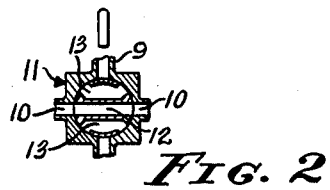
FIGURE 2 is a diagrammatical view of the control valve shown in position to interconnect the pressure vessels.

The pressure vessels 2 are adapted to be pressurized with motive air from a motive air supply 9 through a supply line which includes branches 10 leading to the two pressure vessels. Flow of air to the branch lines 10 is controlled by a valve 11 so arranged that motive air may be supplied to either vessel and simultaneously exhausted from the other vessel, or the vessels may be interconnected while isolated from the motive air. This is accomplished by a rotating member having a diametrical or by-pass bore 12, for interconnecting the pressure vessels as shown in FIGURE 2, and flanking bores 13 for connecting one pressure vessel to the supply line while exhausting the other pressure vessel, as shown in FIGURES 1 and 3.

The lower end of each pressure vessel 2 is provided with a discharge elbow 14 which is connected to a horizontally extending discharge conduit 15. The two conduits are joined through a Y connection 16 to a discharge line 17.

Interposed in each discharge conduit 15 is a venturi throat 18. The downstream end of the venturi throat is provided with a valve seat 19 which is engageable by a check valve 20. The check valve 20 is supported on a valve stem 21 disposed in coaxial relation with the discharge conduit. The stem 21 extends into a guide sleeve 22, preferably containing anti-friction balls 23 so that the guide stem and the check valve move freely.

The guide sleeve 22 is provided with an upstream end cap 24 surrounding the stem 21 and having packing means 25 therein. The guide sleeve 22 is also closed by a downstream end cap 26 having a stem-receiving recess 27. The guide sleeve is supported by a cylindrical mounting body 28 disposed between the end caps 24 and 26.

The mounting body 28 is provided with radiating webs 29 which are secured within a mounting collar 30. The mounting collar is internally screw-threaded so as to be interposed between sections of the discharge conduit 15. The check valve 20 readily opens in response to discharge flow from the corresponding pressure vessel 2, but quickly closes when subjected to backflow.

Figure 4:
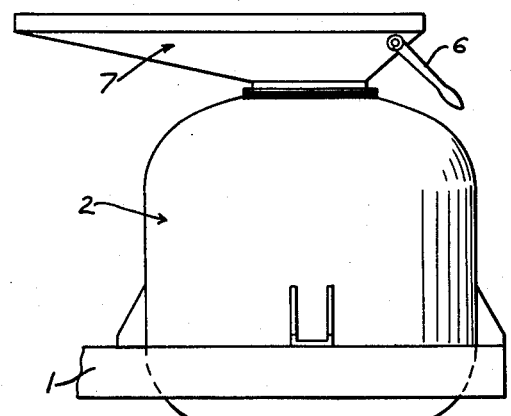
FIGURE 4 is a fragmentary side view thereof.
Figure 5:
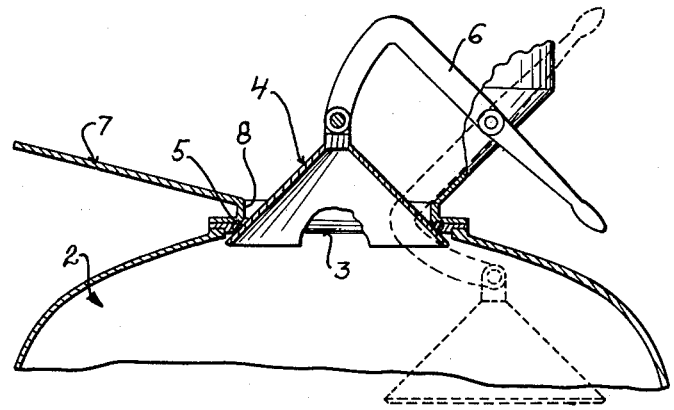
FIGURE 5 is an enlarged, fragmentary, sectional view taken through 5—5 of FIGURE 1.
Figure 6:
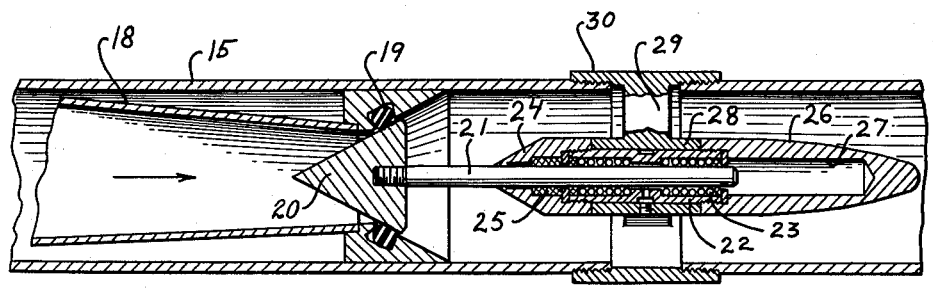
FIGURE 6 is an enlarged, longitudinal, sectional view taken through 6—6 of FIGURE 1, showing one of the check valves in the discharge line.
Figure 7:
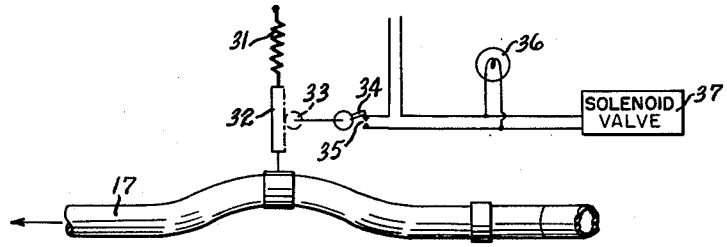
FIGURE 7 is a diagrammatical view showing means for indicating when the load in the active pressure vessel is about to be fully depleted.

Reference is now directed to FIGURE 7, which illustrates a continuation of the line 17 shown in FIGURE 4. It has been discovered that as the contents of a pressure vessel approach depletion, the velocity of flow increases, and the effective weight of the concrete in a unit length of line decreases rather substantially. This characteristic is utilized effectively by supporting a short length of line by means of a spring 31.

Interposed between the spring 31 and line is a rack 32 which drives a pinion 33. Movement of the pinion operates a switch arm 34 which closes a switch 35. The parts are so arranged that under conditions of normal flow the switch 35 is open, but when the weight of the concrete under conditions of increased flow decreases, the switch 35 closes. The switch may merely operate a warning device, such as a light 36, or a sound-producing device. In addition, or alternatively, the control valve 11 may be solenoid-operated, as indicated diagrammatically by 37, and activated to switch flow automatically to the other vessel.

Operation of the means for pumping aerated concrete is as follows:

One of the pressure vessels 2 is initially, substantially filled with aerated concrete. Motive air is supplied to the loaded pressure vessel as indicated in FIGURE 1. During the discharge of concrete from the first pressure vessel, the second pressure vessel is opened and loaded.

When the contents of the first pressure vessel approach depletion, the change in velocity of the flow in the line 17 causes the warning device 36 to operate so that the operator is alerted to operate the control valve 11, or if desired automatic operation of the control valve occurs. Initial movement of the control valve 11 from the position shown in FIGURE 1 to the position shown in FIGURE 2 shuts off flow to both pressure vessels, but interconnects them so that air remaining in the first pressure vessel is discharged into the second or loaded pressure vessel until the pressures in the two vessels are equalized. It should be noted that aerated concrete, before it is set, is compressible. As a consequence, a substantial volume of air is transferred from the first or depleted vessel to the second or loaded vessel in the course of equalizing the pressures therein. When the pressures are equalized, the control valve 11 is turned further to the position shown in FIGURE 3 so that the second vessel is fully pressurized and placed in operation, and the remaining air in the first pressure vessel is exhausted to atmosphere. The first pressure vessel is then opened and loaded while the contents of the second pressure vessel are discharged.

The check valves 20 prevent backflow of the aerated concrete and motive air into the pressure vessel 2 which is open and being loaded. In order to ensure proper operation of the check valves 20, which must be depended upon to function properly, the check valves are mounted in a horizontal position, and frictional contact with the valve stems is minimized.

The method of pumping aerated concrete consists essentially in utilizing two pressure vessels alternately so that one pressure vessel may be in the process of being loaded while the contents of the other pressure vessel is being discharged, and in particular the step of equalizing the pressure between the empty, or virtually empty, vessel and the loaded pressure vessel so as to effect partial repressurizing of the loaded pressure vessel prior to application of motive air to the loaded pressure vessel. It will be observed that with this method a substantial economy in the quantity of motive air is effected. This is due to the fact that the aerated concrete is compressible and thus decreases in volume as the compressed air is introduced from the other vessel.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:

1. Means for pumping aerated concrete, comprising: a pair of contiguous pressure vessels having inlet openings at their upper ends and discharge openings at their lower ends; a common distributor means above said vessels communicating with said inlet openings for directing aerated concrete into either vessel; sealing means for the inlet opening of each vessel whereby either vessel may be sealed while the other is being filled; a distributor line connected with the outlet openings of both vessels; a check valve interposed between each outlet opening and said distributor line to prevent backflow to said vessels; means for supplying motive air alternately to said pressure vessels to drive the contents thereof through said discharge line; and valve means for interconnecting said pressure vessels at their upper ends while closing both of said vessels from said motive air supplying means thereby to partially pressurizing a loaded vessel with the motive air remaining in the other vessel on depletion of its load.

2. Means for pumping aerated concrete, comprising: a pair of contiguous pressure vessels having inlet openings at their upper ends and discharge openings at their lower ends; a common distributor means above said vessels communicating with said inlet openings for directing aerated concrete into either vessel; a sealing ring within each inlet opening; a sealing gate in the form of a cone of larger diameter than said inlet opening disposed within each pressure vessel and movable between a position closing said opening and a laterally displaced position within the corresponding pressure vessel; a distributor line connected with the outlet openings of both vessels; a check valve interposed between each outlet opening and said distributor line to prevent backflow to said vessels; means for supplying motive air alternately to said pressure vessels to drive the contents thereof through said discharge line; and valve means for interconnecting said pressure vessels at their upper ends while closing both of said vessels from said motive air supplying means thereby to partially pressurizing a loaded vessel with the motive air remaining in the other vessel on depletion of its load.

3. Means for pumping aerated concrete, comprising: a pair of contiguous pressure vessels having inlet openings at their upper ends and discharge openings at their lower ends; a common distributor means above said vessels communicating with said inlet openings for directing aerated concrete into either vessel; sealing means for the inlet opening of each vessel whereby either vessel may be sealed while the other is being filled; a distributor line connected with the outlet openings of both vessels; a check valve interposed between each outlet opening and said distributor line to prevent backflow to said vessels; means for supplying motive air alternately to said pressure vessels to drive the contents thereof through said discharge line; means connected with said distributor line for sensing approaching depletion of the contents of the pressure vessel in operation; and valve means for interconnecting said pressure vessels at their upper ends while closing both of said vessels from said motive air supplying means thereby to partially pressurizing a loaded vessel with the motive air remaining in the other vessel on depletion of its load.

4. Means for pumping aerated concrete, comprising: a pair of contiguous pressure vessels having inlet openings at their upper ends and discharge openings at their lower ends; a common distributor means above said vessels communicating with said inlet openings for directing aerated concrete into either vessel; a sealing ring within each inlet opening; a sealing gate in the form of a cone of larger diameter than said inlet opening disposed within each pressure vessel and movable between a position closing said opening and a laterally displaced position within the corresponding pressure vessel; a distributor line connected with the outlet openings of both vessels; a check valve interposed between each outlet opening and said distributor line to prevent backflow to said vessels; and means for supplying motive air alternately to said pressure vessels to drive the contents thereof through said discharge line.

5. Means for pumping aerated concrete, comprising: a pair of contiguous pressure vessels having inlet openings at their lower ends and discharge openings at their lower ends; a common distributor means above said vessels communicating with said inlet openings for directing aerated concrete into either vessel; sealing means for the inlet opening of each vessel whereby either vessel may be sealed while the other is being filled; a distributor line connected with the outlet openings of both vessels; a check valve interposed between each outlet opening and said distributor line to prevent backflow to said vessels; means for supplying motive air alternately to said pressure vessels to drive the contents thereof through said discharge line; and means connected with said distributor line for sensing approaching depletion of the contents of the pressure vessel in operation.

6. Means for pumping areated concrete, comprising: a pressure vessel having an inlet opening at its upper end for receiving aerated concrete and an outlet opening at its lower end; a seal bordering said inlet opening within said pressure vessel; a conical gate of larger diameter than said inlet opening disposed within said pressure vessel; a support for said gate including a handle for manipulating said gate between a position sealing said inlet opening against pressure within said pressure vessel, and a position at one side of said inlet opening and within said pressure vessel; and means for pressurizing said pressure vessel to drive aerated concrete through said outlet opening.

7. Means for pumping aerated concrete, comprising: a pressure vessel having an inlet opening at its upper end for receiving aerated concrete and an outlet opening at its lower end; a seal bordering said inlet opening within said pressure vessel; a conical gate of larger diameter than said inlet opening disposed within said pressure vessel; a support for said gate including a handle for manipulating said gate between a position sealing said inlet opening against pressure within said pressure vessel, and a position at one side of said inlet opening and within said pressure vessel; means for pressurizing said pressure vessel to drive aerated concrete through said outlet opening; a discharge duct leading from said outlet opening; and means for weighing the contents of a portion of said discharge duct thereby to detect depletion of said aerated concrete therefrom.

8. Means for pumping aerated concrete, comprising: a pair of contiguous pressure vessels each having an inlet opening at its upper end and a discharge opening at its lower end; a seal bordering each inlet opening within each of said pressure vessels; a conical gate of larger diameter than said inlet openings disposed within each pressure vessel; a support for each gate including a handle for manipulating said gate between a position sealing said inlet opening against pressure within said pressure vessel, and a position at one side of said inlet opening; means for pressurizing said pressure vessels to drive aerated concrete therefrom; and a valve incorporated in said pressurizing means for diverting pressurizing fluid to either of said pressure vessels for alternate discharge of aerated concrete therefrom, said valve means having an intermediate position isolating said pressure vessels from said pressurizing means and interconnecting said pressure vessels to equalize the pressure therebetween.

9. Means for pumping aerated concrete, comprising: a pair of contiguous pressure vessels each having an inlet opening at its upper end and a discharge opening at its lower end; a seal bordering each inlet opening within each of said pressure vessels; a conical gate of larger diameter than said inlet openings disposed within each pressure vessel; a support for each gate including a handle for manipulating said gate between a position sealing said inlet opening against pressure within said pressure vessel, and a position at one side of said inlet opening; means for pressurizing said pressure vessels to drive aerated concrete therefrom; a valve incorporated in said pressurizing means for diverting pressurizing fluid to either of said pressure vessels for alternate discharge of aerated concrete therefrom, said valve means having an intermediate position isolating said pressure vessels from said pressurizing means and interconnecting said pressure vessels to equalize the pressure therebetween; a discharge line leading from the outlet of each pressure vessel; a check valve in each discharge line to prevent backflow therein; a common discharge conduit connected to both of said discharge lines; and means for weighing a portion of said discharge conduit to detect loss of weight therein due to depletion of concrete from the pressure vessel operatively connected therewith.

References Cited in the file of this patent

UNITED STATES PATENTS

| | | |
|---|---|---|
| 648,101 | Carpenter | Apr. 24, 1900 |
| 899,101 | Conkell | Sept. 22, 1908 |
| 925,012 | Moore | June 15, 1909 |
| 1,197,771 | Shue | Sept. 12, 1916 |
| 1,600,505 | Hunter | Sept. 21, 1926 |
| 1,718,178 | Oliphant | June 18, 1929 |
| 1,763,234 | Gyger | June 10, 1930 |
| 2,300,039 | Yeomans et al. | Oct. 27, 1942 |
| 2,347,213 | Neidl | Apr. 25, 1944 |
| 2,827,922 | Guinard | Mar. 25, 1958 |
| 2,829,669 | Luzynski | Apr. 8, 1958 |
| 2,943,578 | McCombie | July 5, 1960 |